United States Patent [19]

Bergeson et al.

[11] Patent Number: 4,916,950

[45] Date of Patent: Apr. 17, 1990

[54] DIAPHRAGM GAUGE FOR STAND-ALONE LIQUID STORAGE TANKS

[76] Inventors: James D. Bergeson; Marion D. Bergeson, both of R.R. #2, Carstairs, Alberta, Canada, T0M 0N0; James C. Bergeson, Box 277, Cremona, Alberta, Canada, T0M 0R0; Gary W. Dorin, Box 1329, Didsbury, Alberta, Canada, T0M 0W0

[21] Appl. No.: 309,660

[22] Filed: Feb. 13, 1989

[51] Int. Cl.[4] .............................................. G01F 23/16
[52] U.S. Cl. ...................................... 73/299; 73/301; 73/715
[58] Field of Search ................. 73/299, 715, 294, 301, 73/715

[56] References Cited

U.S. PATENT DOCUMENTS

| | | | |
|---|---|---|---|
| 684,429 | 10/1901 | Holland | 73/299 X |
| 1,246,270 | 11/1917 | Huffman | |
| 1,259,680 | 3/1918 | Theobald | |
| 1,265,676 | 5/1918 | Klump | |
| 1,383,866 | 7/1921 | Shephard | 73/299 |
| 1,410,469 | 3/1922 | Goranson | 73/299 |
| 1,981,354 | 11/1934 | Goerg | 73/299 |
| 1,990,386 | 2/1935 | Kysor | 137/558 X |
| 2,614,427 | 4/1951 | Hunter et al. | |
| 3,385,110 | 5/1968 | Atwood et al. | 73/327 |
| 3,688,585 | 9/1972 | Capra | |
| 3,713,338 | 1/1973 | Kind | |
| 4,343,184 | 8/1982 | Jaulmes | |

Primary Examiner—Daniel M. Yasich
Attorney, Agent, or Firm—Nixon & Vanderhye

[57] ABSTRACT

A gauge is disclosed which is particularly suitable for use on stand-alone liquid storage tanks typically found outdoors or on worksites. Fluid from the lower portion of the tank is allowed to flow into a chamber bounded on one side by a resilient deformable diaphragm. The pressure exerted by the fluid deforms the diaphragm displacing it outward, which displacement is mechanically transmitted to cause pivotal displacement of an indicator needle. The amount of displacement of the needle depends upon the magnitude of the fluid pressure, which itself is proportional to the depth of the liquid in the tank, thus providing a reading of that depth.

6 Claims, 1 Drawing Sheet

DIAPHRAGM GAUGE FOR STAND-ALONE LIQUID STORAGE TANKS

BACKGROUND OF THE INVENTION

This invention relates to a device for measuring the level of liquid in a stand-alone liquid storage tank of the type, for example, often used on farms or in other outdoor operations to store fuel for vehicles or other liquid fuel powered equipment.

While various devices are known for measuring the level of fluid in a reservoir, most are designed for a particular purpose and none is practically adaptable for the type of situation described above. Many such devices are relatively fragile, and susceptible to breakage if situated in a locus of heavy physical or mechanical activity, as stand-alone liquid storage tanks typically are. Similarly such devices may not be reliably functional in a location exposed to extremes of temperature or weather. Devices frequently must be attached directly to the tank containing the fluid, so that breakage as a result of accident, weather, or the like may cause loss of the contents of the reservoir. Finally, devices may be inappropriate because of difficulty or awkwardness of use, or requirement for an external power source.

SUMMARY OF THE INVENTION

The present invention is a device consisting of a small number of durable parts which avoids these problems. According to the invention, liquid from the tank is introduced into a chamber bounded on one side by a resilient deformable diaphragm. The displacement of the diaphragm as a result of the fluid pressure of the liquid is mechanically transmitted to and displaces a hinged indicator needle an amount proportional to the depth of liquid remaining in the tank, thereby indicating the level of liquid in the tank.

Because the gauge uses simple mechanical means to indicate the fluid level, it operates in extremes of temperature and weather, does not require an external power source, is easy to use, and may be constructed to be resistant to breakage. The gauge is easy to install, and may be connected to the dry side of the tank ON-OFF valve so that if breakage does occur, the liquid in the tank will not be lost. The gauge may be calibrated, by using different materials in the diaphragm or by inserting springs of different tension, to be used with a large variety of liquids and liquid depths.

BRIEF DESCRIPTION OF THE DRAWINGS

In the accompanying drawings, which illustrate embodiments of the invention.

DESCRIPTION OF THE PREFERRED EMBODIMENT

Figure 1:
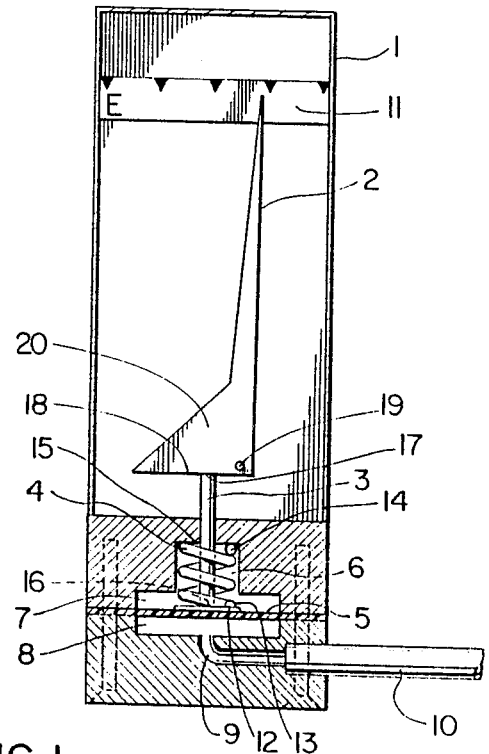
FIG. 1 is an elevation partly in section of one embodiment.

The gauge consists of housing 1, indicator needle 2, piston 3, spring 4, diaphragm 5, spring retaining cavity 6, upper diaphragm chamber 7, lower diaphragm chamber 8, conduit 9, connecting pipe 10 and indicator graph 11.

Figure 2:
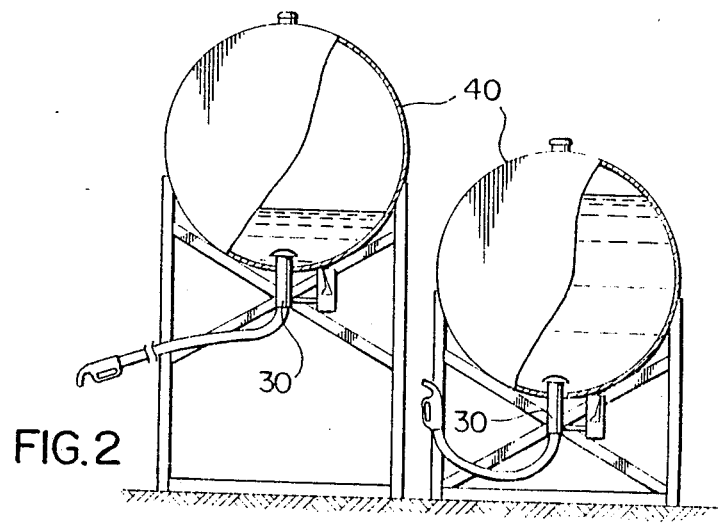
FIG. 2 is a view of the gauge of FIG. 1 mounted for operation on a typical tank and indicating nearly empty and nearly full states.

Housing 1 is formed of rigid material and contains upper and lower diaphragm chambers 7, 8 and resilient deformable diaphragm 5 which is affixed to the housing and separates the two chambers. In the preferred embodiment, diaphragm 5 is formed of neoprene, but may be formed of another suitable deformable impervious material. Lower diaphragm chamber 8 communicates via conduit 9 through housing 1 with connecting pipe 10, which is connected to ON-OFF valve 30 of tank 40 (FIG. 2).

The wall of upper diaphragm chamber 7 opposite diaphragm 5 forms cyclindrical cavity 6 with axis perpendicular to the plane of the diaphragm in its relaxed state, which cavity retains co-axially disposed cylindrical coil spring 4. Spring 4 is seated at its lower edge 13 against central portion 12 of the upper surface of diaphragm 5, and at its upper edge 14 against upper boundary surface 15 of spring retaining cavity 6.

Piston 3 is a rigid member extending essentially co-axially with spring 4 and spring retaining cavity 6 from the upper surface of diaphragm 5 through the wall of upper diaphragm chamber 7 to indicator needle 2. In the illustrated embodiment, the parts are arranged so that the force of gravity serves to maintain touching contact between lower and upper ends 16, 17 of piston 3, and diaphragm 5 and indicator needle 2 respectively. In other possible embodiments in which the parts are not so arranged that the force of gravity has this effect, fastening means may be required to maintain touching contact as aforesaid.

Indicator needle 2 is a rigid elongated member with an indicator point at its distal end and attached at its proximal end to housing 1 by pivot pin 19. Upper end 17 of piston 3 is in touching contact with underside surface 18 of lever arm 20 attached to, or forming an integral part of indicator needle 2 and extending from the proximal end of indicator needle 2. In the illustrated embodiment, indicator needle 2 is disposed generally parallel to piston 3 and lever arm 20 extends perpendicular both to the main shaft of indicator needle 2 and to pivot pin 19. In other embodiments (not shown), lever arm 20 may extend at a different angle to the main shaft of indicator needle 2, and may in fact coincide with the main shaft if indicator needle 2 is disposed generally perpendicular to piston 3.

Further, in the illustrated embodiment, the length of lever arm 20 is significantly less than the length of the main shaft of indicator needle 2, providing mechanical magnification of the displacement of the indicator point. Alternative magnifying means (not shown) can be utilized, for example, an optical magnifying device can be attached to or incorporated in housing 1 to provide visual magnification of the displacement of the indicator point.

Preferably, housing 1 is formed of transparent material and extends upward from lower and upper diaphragm chambers 8, 7 surrounding indicator needle 2, but has a hollow interior to allow pivotal movement of indicator needle 2. Indicator graph 11 affixed to housing 1 bears letter E and other reference points marking the position of the distal end of indicator needle 2.

The gauge can be mounted to the dry or upstream side of ON-OFF tank valve 30 (FIG. 2). When valve 30 is turned on, the pressure of the liquid in the tank is applied through connecting pipe 10 and through conduit 9 to lower diaphragm chamber 8 and thence to the underside of diaphragm 5. The fluid pressure tends to force the central portion 12 of diaphragm 5 upwards into upper diaphragm chamber 7 of the gauge against the restraining force of spring 4, whose lower edge 13 bears against the upper surface of diaphragm 5 and whose upper edge 14 bears against upper boundary surface 15 of spring retaining cavity 6. Upward movement of diaphragm 5 pushes piston 3, whose lower end 16 rests on diaphragm 5, upward.

Upward movement of piston 3, whose upper end 17 is in contact with underside 18 of indicator needle 2, forces indicator needle 2 to pivot about pin 19 in a clockwise direction. Equally, downward movement of piston 3 permits needle 2, which is biased by gravity, to pivot counterclockwise. A higher level of liquid in tank 40 creates a higher pressure applied to diaphragm 5; a lower level of liquid creates a lower pressure applied to diaphragm 5. A change in level causes a change in pressure and consequently a change in the amount of upward displacement of central portion 12 of diaphragm 5. A change in the displacement of diaphragm 5 tilts indicator needle 2. The pivotal position of indicator needle 2 thus represents the static pressure in tank 40 which is reflective of the amount of liquid remaining.

Indicator needle 2 is hinged, calibrated and balanced in such a way that as liquid is added to the tank indicator needle 2 will move to the right on indicator graph 11. Similarly, as liquid is removed from the tank indicator needle 2 will move to the left on indicator graph 11 and point to E ("empty") when the tank is empty. If lower diaphragm chamber 8 is permitted to drain when valve 30 is shut off, then indicator needle 2 will return to point to E ("empty") on indicator graph 11. However, the gauge can also be mounted to the wet or upstream side of valve 30 or at any other location near the bottom of the tank, such that connecting pipe 10, conduit 9 and lower diaphragm chamber 8 remain in constant fluid communication with the contents of the tank. In this configuration (not shown) the indicator needle does not move except when there is a change in the level of the liquid in the tank, as previously described.

The gauge may be calibrated by (1) adjusting the length of piston 3; (2) adjusting the force of compression of spring 4 (as by seating shims (not shown) between upper edge 14 of spring 4 and upper boundary wall 15 of spring cavity 6); or (3) varying the stiffness of diaphragm 5 (as by varying the number and/or thickness of layers of neoprene or other material of which diaphragm 5 is made).

If diaphragm 5 has appropriate stiffness and resilience, spring 4 may not be necessary. However, if diaphragm 5 is readily easily deformed, spring 4 will be required.

Although the preferred embodiment of this invention has been shown and described, it should be understood that various modifications and rearrangements of the parts may be resorted to without departing from the scope of the invention as disclosed and claimed herein.

What is claimed is:

1. A gauge for measuring the depth of liquid in a tank comprising:
   (a) a housing containing adjacent inner and outer chambers;
   (b) a resilient deformable diaphragm positioned within the housing separating said inner and outer chambers;
   (c) a rigid indicator needle being pivotally attached at its proximal end to the housing, and having an indicator point at its distal end and a lever arm extending from the proximal end;
   (d) means for providing fluid communication between the tank and the inner chamber;
   (e) means for mechanically transmitting displacement of the deformable diaphragm resulting from a change of fluid pressure on its inner surface to the lever arm thereby to cause pivotal displacement of the indicator needle.

2. A gauge according to claim 1 further comprising spring means disposed within the outer chamber between the outer surface of the deformable diaphragm and the housing, to bias the outward displacement of said diaphragm against the fluid pressure on its inner surface.

3. A gauge according to claim 1 wherein the means for mechanically transmitting displacement of the deformable diaphragm to cause pivotal displacement of the indicator needle is a rigid piston member in touching contact at one end with the central portion of the outer surface of said diaphragm, and at the other with a surface on the lever arm of the indicator needle.

4. A gauge according to claim 1 wherein the deformable diaphragm is formed of neoprene.

5. A gauge according to claim 1 wherein the means for providing fluid communication between the tank and the inner chamber includes a pipe connected to the downstream side of the discharge valve of the tank.

6. A gauge according to claim 1 wherein the housing is formed of transparent plastic and extends to enclose the indicator needle.

* * * * *